United States Patent [19]

Matysak

[11] 4,291,785

[45] Sep. 29, 1981

[54] OIL METERING APPARATUS FOR AIR LINE LUBRICATORS

[75] Inventor: Edward A. Matysak, Bellevue, Wash.

[73] Assignee: The Boeing Company, Seattle, Wash.

[21] Appl. No.: 65,409

[22] Filed: Aug. 10, 1979

[51] Int. Cl.³ .............................................. F16N 7/34
[52] U.S. Cl. .................................... 184/55 A; 184/58
[58] Field of Search .................... 184/55 A, 55 R, 58, 184/59

[56] References Cited

U.S. PATENT DOCUMENTS

| | | | |
|---|---|---|---|
| 1,564,820 | 12/1925 | Blanchard | 184/55 A X |
| 1,656,708 | 1/1928 | Hansen | 184/55 A |
| 1,669,375 | 5/1928 | Ihrmark | 184/55 A |
| 1,751,714 | 3/1930 | Peters | 184/55 A |
| 1,850,924 | 3/1932 | Day | 184/7 CR |
| 1,939,654 | 12/1933 | Bijur | 184/7 CR |
| 2,223,700 | 12/1940 | Norgren | 184/55 A |
| 2,406,141 | 8/1946 | Fredericks | 138/40 |
| 2,442,777 | 6/1948 | Norgren | 184/55 A |
| 2,511,016 | 6/1950 | Semon | 184/55 A |
| 2,535,756 | 12/1950 | Ronceray | 184/55 A |
| 2,571,770 | 10/1951 | Semon | 184/55 A |
| 2,582,689 | 1/1952 | Fossum | 184/55 A |
| 2,729,306 | 1/1956 | Davis | 184/6 |
| 2,921,649 | 1/1960 | Wilkerson | 184/55 A |
| 2,953,167 | 9/1960 | Smith et al. | 138/40 |
| 2,957,682 | 10/1960 | Cameron et al. | 261/23 A |
| 2,958,334 | 11/1960 | Curtis | 137/412 |
| 3,297,106 | 1/1967 | Hanson et al. | 184/55 A |
| 3,698,431 | 10/1972 | Thompson | 261/71 |
| 3,872,662 | 3/1975 | Atwood et al. | 57/120 |

*Primary Examiner*—David H. Brown
*Attorney, Agent, or Firm*—Ronald E. Suter; Bernard A. Donahue

[57] ABSTRACT

An improved lubricant metering valve for use in air line lubricant systems is disclosed. To preclude improper tampering with the system the device is not adjustable. The valve has a center metering pin which is permitted to undergo limited movement within the valve body to prevent clogging.

5 Claims, 3 Drawing Figures

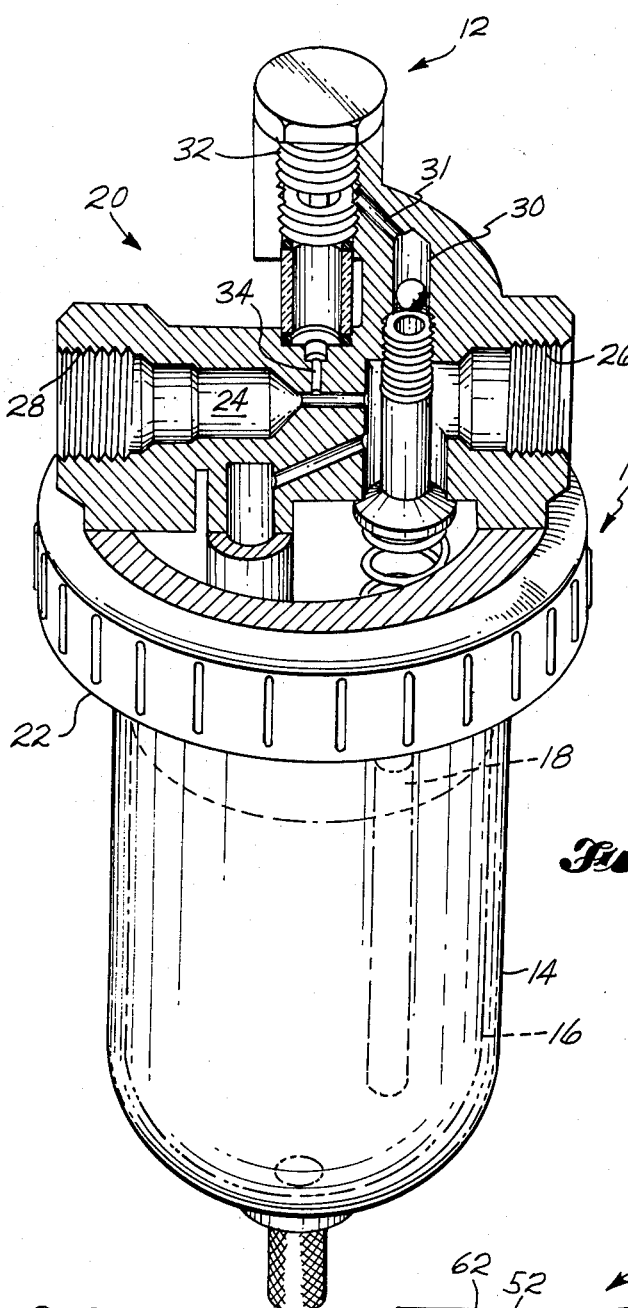
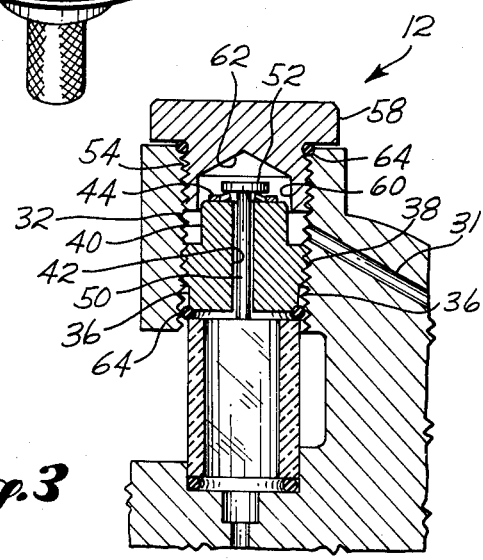
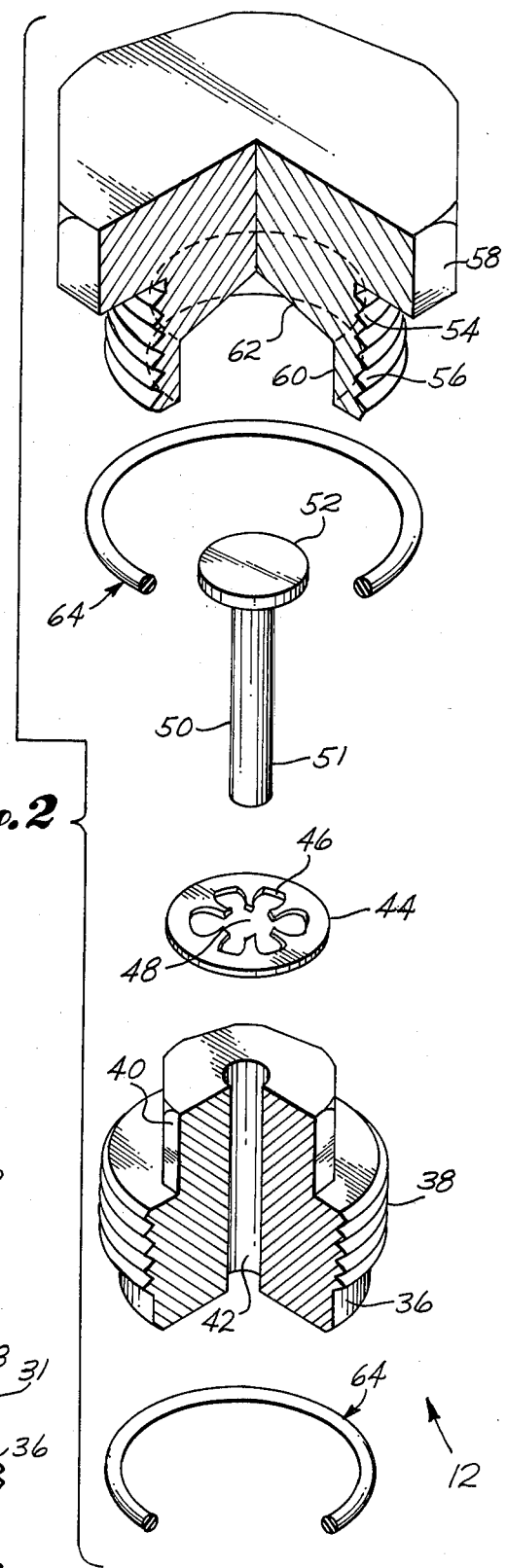
Fig. 1
Fig. 2
Fig. 3

OIL METERING APPARATUS FOR AIR LINE LUBRICATORS

BACKGROUND OF THE INVENTION

1. Field of the Invention

This invention relates generally to the supply of minute, closely regulated quantities of fluid and, more particularly, to the supply of precise quantities of lubricant to pneumatically driven machines and tools through the compressed air supply line.

2. Background of the Invention

Initially, lubrication of pneumatically operated machines and tools was carried out on a periodic basis by hand. This arrangement suffered the disadvantages of requiring the device to be taken out of service, being often accidentally overlooked and, as a practical matter, being intentionally overlooked because of the inconvenience. As a result, air line lubricant dispensers were devised. These devices were intended to continuously supply lubricant through the air line, thus permitting the device to remain in service and, as long as the reservoir contained lubricant, could not be accidentally or intentionally overlooked.

Lubricators of this type are generally needle valves which are adjustable so as to be responsive to various types of lubricants and lubrication demands. Systems of this type are frequently rendered inoperative due to malfunction of the metering device. Present lubrication systems are subject to clogging which reduces lubricant output and causes operators to improperly readjust the device in an effort to increase lubricant flow. Should the blockage then clear, an excessive quantity of lubricant is supplied to the tool. The tool then must be removed from service for cleaning. If the reduced lubricant flow goes unnoticed, the tool or machine could be damaged or destroyed. Merely precluding such unauthorized adjustment fails to solve the real problem, i.e., the tendency of existing systems to clog.

It is, accordingly, an object of the present invention to provide an air line lubricant metering system that is not subject to these and other limitations and disadvantages of existing systems.

It is another object to provide a lubricant metering system that is not subject to unauthorized adjustment and cannot, therefore, deliver excess lubricant.

It is a further object of the invention to provide an oil metering that is continuously self-cleaning.

It is still another object of the invention to provide a lubricant metering valve for an air line lubricating system that may be inexpensively manufactured and easily substituted for existing metering valves with minimum expense.

SUMMARY OF THE INVENTION

Briefly, these and other objects are achieved in accordance with the structural aspects of a example of the invention in which a metering body is provided with a cylindrical bore of a predetermined diameter into which is inserted a metering pin. The pin has a cylindrical body of a diameter that is a predetermined amount less than the diameter of the bore. At one end, the pin has an enlarged head to keep the body from falling completely through the bore. The head is spaced from the end of the metering body by a washer and is permitted to move within the bore, responsive to pressure changes, to provide a self-cleaning function while at the same time precisely metering the desired quantity of lubricant to the air line. The amount of lubricant dispensed is a function of the space between the metering body bore and the pin body as well as the pin body length. Although this quantity may be readily changed by simply replacing the pin with one of a different body diameter, unauthorized operator adjustment is precluded since no pins need be available.

Further details of these and other novel features and their operation and cooperation as well as additional objects and advantages of the invention will become apparent and be best understood from a consideration of the following description, taken in connection with the accompanying drawing which is provided by way of illustrative example only.

BRIEF DESCRIPTION OF THE DRAWINGS

FIG. 1 is a partially cut-away perspective view of an air line lubricating system incorporating the improved metering valve of the invention.

FIG. 2 is a partially cut-away perspective, exploded view of the improved metering valve.

FIG. 3 is a sectional view of the improved metering valve.

DETAILED DESCRIPTION OF THE PREFERRED EMBODIMENT

With specific reference now to the figures in detail it is stressed that the particulars shown are by way of example and for purposes of illustrative discussion only and are presented in the cause of providing what is believed to be the most useful and readily understood description of the principles and structural concepts of the invention. In this regard, no attempt is made to show or discuss structural details of the apparatus in more detail than is necessary for a fundamental understanding of the invention. The description taken with the drawing will make it apparent to those skilled in the mechanical arts how the several forms of the invention may be embodied in practice. Specifically, the detailed showing is not to be taken as a limitation upon the scope of the invention which is defined by the appended claims forming, along with the drawing, a part of this specification.

In FIG. 1 there is shown one type of conventional air line lubricator generally designated 10, utilizing the improved metering device, generally designated 12. Lubricator 10 includes a bowl 14 containing a quantity of lubricating fluid 16, such as oil. A siphon tube 18 extends into bowl 14 and provides a passage for fluid 16 into a main body, generally designated 20. Main body 20 is secured to bowl 18 by means of a threaded clamp ring 22 or other conventional means. Air passage 24 is provided through main body 22 and includes an inlet 26, an outlet 28 and a venturi section 29. As shown in FIG. 1 both inlet 26 and outlet 28 may include threaded portions for removably securing air lines (not shown) thereto, for connecting to a tool and an air source. Tube 18 extends into main body 20 and may be threadably received in a bore 30, which communicates via passage 31 with a bore 32. Bore 32 is open at one end to the outside of body 20 and includes a reduced diameter portion 34 at its other end, which, in turn, communicates with air passage 24. As seen in FIGS. 1 and 3, improved metering device 12 is threadably received in bore 32.

Turning now to FIGS. 2 and 3, improved metering device 12 will be described in more detail. Device 12 includes a metering body 36 which has a threaded portion 38 adjacent one end thereof and a plurality of obliquely oriented, flat faces 40 adjacent the other end to provide a convenient means of applying an installation tool, such as a wrench, to body 36. Metering body 36 is also provided with a bore 42 therethrough, having a predetermined and precisely controlled internal diameter. Device 12 also includes a spacer 44 which, in the preferred embodiment, may be a cad plated or brass lock or star washer having a thickness of 0.015–0.019 inches and having a plurality of cutouts 46 in the inner rim thereof producing a minimum inner opening diameter in the range of 0.112–0.123 inches. Spacer 44 serves to prevent pin head 52 from bottoming out on body 40 and interfering with the flow of oil. To do this, the internal diameter 48 of washer 44 should be sufficient to permit smooth passage of pin body 50 of a metering pin 51 therethrough. An enlarged, head 52 is provided at one end of pin body 50. The external diameter of pin body 50 is a predetermined amount less than the diameter of bore 42. In the preferred embodiment the diameter of bore 42 is 0.0937 inches and the diameter of pin body 50 ranges from 0.0915–0.0930 inches, producing a difference in diameters of between 0.0022 and 0.0007 inches which has been found satisfactory depending upon the desired flow rate and the type of lubricant in use. When assembled, pin body 50 passes through washer 44 and into bore 42 with head 52 resting on washer 44. The length of pin body 50 is also selected on the basis of the desired flow rate and type of lubricant and, in the preferred embodiment, is approximately 0.05 inches longer than bore 42. Finally, device 12 includes a cap 54 having a threaded portion 56 at one end and a plurality of obliquely oriented faces 58 at the other end. Threaded end 56 includes a centrally located blind recess 60 therein. In the preferred embodiment, a conical or domed surface 62 is provided at the bottom of recess 60, however, such surface could be flat if desired. In use, surface 62 of cap 54 is located a predetermined distance from the top of pin head 52. As will be further described herein, pressure changes occurring in main body 12 will cause pin 51 to move slightly within bore 42. The maximum extent of this movement in a direction away from metering body 36 will be determined by the location of surface 62. Conventional O-rings 64 may be provided on metering body 36 and cap 54 to create a seal against main body 20 (see FIG. 3). The elements of metering device 12 may be made of, e.g. brass or any other material not adversely effected by the lubricants.

In operation, as high pressure air moves through passage 24, a vacuum is created above bowl 14. This suction lifts lubricant out of bowl 14 through siphon tube 18, bore 30, passage 31 and into bore 32 between cap 54 and metering body 36. Suction through portion 34 then draws lubricant at the desired rate between bore 42 and pin body 50 into air passage 24. When the tool or machine (not shown) is alternately turned on and off, the air flow through passage 24 starts and stops. This creates pressure changes in bore 32 which cause pin 51 to move within bore 42. This motion provides a cleaning function clogging of the metering device 12. If a different flow rate is desired, cap 54 is removed and a different pin 51, having the desired body diameter is inserted.

Variations and modifications will occur to persons skilled in the art without departing from the spirit and scope of the invention. Accordingly, it is intended the appended claims cover all such variations and modifications.

What is claimed is:

1. In a compressed air line lubricator for supplying lubricant to pneumatically operated machines and tools including a bowl for retaining a supply of lubricant, a main body attached to the top of said bowl, an air passage through said main body and a siphon tube for passing lubricant from said bowl to said main body, the improvement comprising means for passing a precise quantity of lubricant from said main body to said air line including a metering body removably secured in said main body, said metering body having a cylindrical bore of predetermined diameter therethrough; a metering pin, having a cylindrical body of a predetermined diameter less than the diameter of said bore and a head of a diameter greater than the diameter of said bore; a cylindrical washer having an opening therein of a diameter greater than the diameter of said pin body and less than the diameter of said pin head, said washer being located between and separating said pin head and said metering body when said pin is inserted in said bore; and means for retaining said pin in said bore while permitting said pin limited motion with respect to said metering body responsive to pressure changes within said main body; whereby precise amounts of lubricant are dispensed between the pin body and the bore and movement of the pin within the bore prevents clogging.

2. The improvement as claimed in claim 1 wherein said means for retaining said pin comprises a cap removably secured to said main body, said cap having a surface thereon which, in the installed position of said cap is located a predetermined distance from said pin head.

3. The improvement as claimed in claims 1 or 2 wherein the diameter of said bore is 0.0937 inches and the diameter of said pin body ranges from 0.0915 inches to 0.0930 inches depending on the type of lubricant and the desired lubricant supply rate.

4. The improvement as claimed in claim 3 wherein the washer is a star washer having a thickness of 0.015 inches to 0.019 inches and a minimum opening diameter in the range of 0.112 inches to 0.123 inches.

5. The improvement as claimed in claim 4 wherein said cap is provided with a recess which faces said pin head in the installed position and said surface is conical and is located within said recess.

* * * * *